Gilbert Rowe
John L. Bryan, Jr.
Stanley E. Jaros
Bruce R. Tegge

Inventors

By *W. H. Smyers*  Attorney

Gilbert Rowe
John L. Bryan, Jr.
Stanley E. Jaros
Bruce R. Tegge

Inventors

By W. H. Smyers

Attorney 3,129,205
REACTOR FLUSHING SYSTEM
Gilbert Rowe, Clark Township, Union County, John L. Bryan, Jr., Summit, Stanley E. Jaros, Watchung, and Bruce R. Tegge, Madison, N.J., assignors to Esso Research and Engineering Company, a corporation of Delaware
Filed Nov. 3, 1958, Ser. No. 771,646
1 Claim. (Cl. 260—85.3)

The present invention relates to the manufacture of butyl rubber. More particularly, it relates to a new stabilized fractionation system with decreased size for flushing, charging, and discharging the contents of the butyl reactors wherein the rubbery copolymer is prepared.

It is well known in the art to polymerize an isoolefin with a multiolefin in the presence of a Friedel-Crafts catalyst within reactors cooled to a relatively low temperature such as −150° F. It is also known that this reaction results in gradual fouling due to the deposition of the rubbery polymer on the reactor heat exchange surfaces. This is highly objectionable since the coefficient of heat transfer is decreased and the circulation of the reaction mixture is reduced.

In the past, several methods were employed to clean the reactors in order to remove the polymer deposited on its walls. Among these methods were the flushing of the reactor with solvents, e.g., straight-run naphtha, hexane, benzene, and the like as described in U.S. Patent 2,455,665; with warm feed containing isobutylene and isoprene as per U.S. Patent 2,563,624; and with liquid isobutylene as per U.S. Patent 2,580,019. However, the most effective method was to dilute the reactor slurry with a dry recycle liquid stream comprising about 95 wt. percent methyl chloride and about 5 wt. percent isobutylene and other olefins followed by washing with warm naphtha. Accordingly, this invention is concerned with this method and the improvement thereto.

The butyl rubber polymer is prepared by reacting 70 to 99.5 parts by weight, preferably 95 to 99.5, of an isoolefin with 30 to 0.5 parts by weight, preferably 5 to 0.5, of multiolefin. The isoolefin, in general, is a $C_4$ to $C_7$ compound, as isobutylene or 2-methyl-butene-1. The multiolefin, in general, is a $C_4$ to $C_{10}$ conjugated diolefin such as isoprene, butadiene, dimethyl butadiene, cyclopentadiene, or piperylene. The preferred polymer is obtained by reacting 95 to 99.5% by weight of isobutylene with 0.5 to 5% by weight of isoprene. Mixture of monomers, preferably with 1 to 5 volumes of inert diluent, e.g., methyl chloride, should be cooled to a temperature between 0 and −200° C. and it is preferred that the temperature range be between −60° and −130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.02 to 0.4% by weight of the mixed olefins. The polymerization reaction is rapid and the polymer precipitates out of the solution in the form of a slurry or flocculent white solid. The polymer, which is recovered and dried, has a Staudinger molecular weight between 20,000 and 150,000, preferably 40,000 to 80,000; and an iodine number between 0.5 and 50, preferably between 1 and 5. The preparation of this copolymer is promulgated in U.S. Patent 2,356,128 which is incorporated herein by reference.

This invention may be understood from the following description in conjunction with the accompanying drawings in which:

FIG. 1 demonstrates a conventional flow plan for flushing a butyl rubber reactor.

Figure 1:
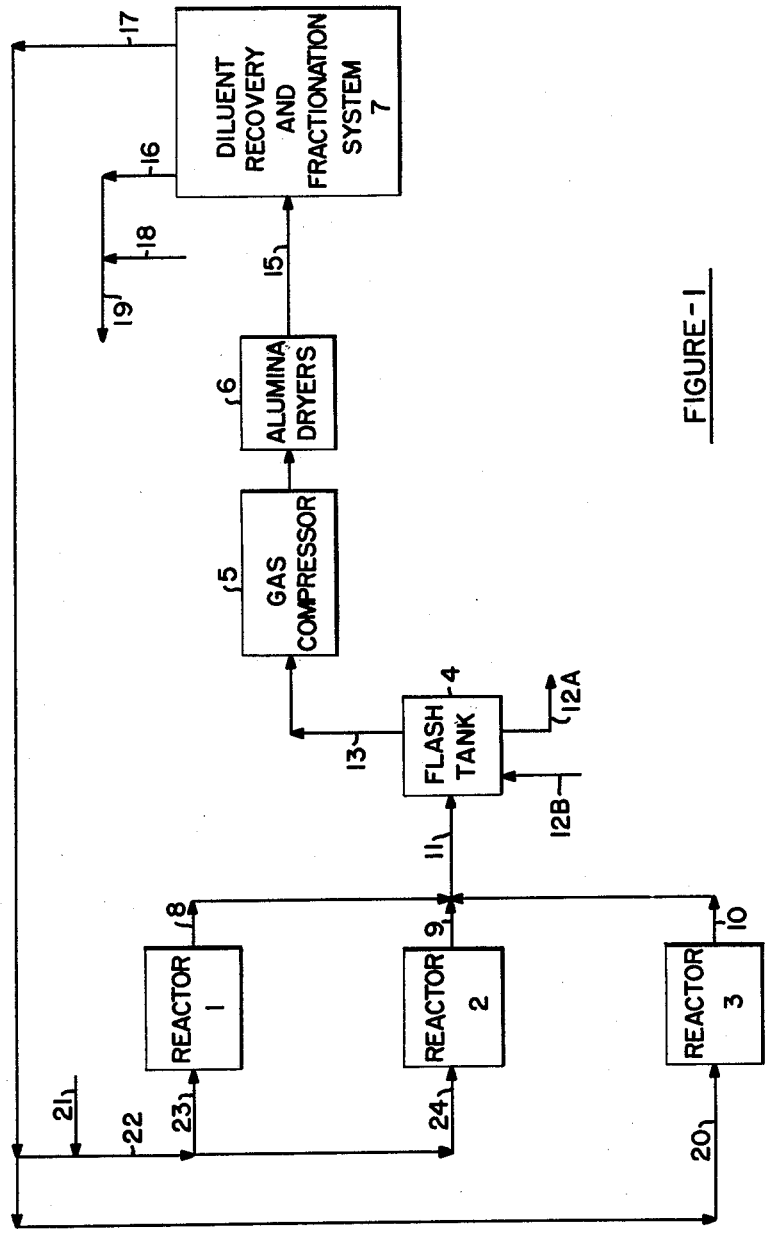

Referring now to FIG. 1, a conventional flow plan for flushing butyl rubber reactors will be described. Isobutylene and isoprene feed are introduced by means of inlets 23 and 24 into heat exchanger-type reactors 1 and 2, respectively, wherein the normal reaction process for preparing butyl rubber is being performed. The third reactor 3 is the one that is currently being flushed with recycle liquid stream which is introduced through inlet 20. Outlets 8 and 9 are provided for the discharge of cold polymer slurry in reaction liquid from reactors 1 and 2, respectively. Outlet 10 provides for the discharge of the flushing stream from reactor 3. The streams from all three outlets pass through inlet 11 into flash tank 4. The flash tank serves to flash off the volatile materials contained in the water slurry that is formed therein. A slurry of butyl rubber in water is withdrawn from outlet 12A and the water is returned to flash tank 4 through line 12B. The materials vaporized in the flash tank, e.g., unreacted isoprene, unreacted isobutylene, and methyl chloride, and the like, are withdrawn from outlet 13 and pass through gas compressor 5 and alumina driers 6. If desired, individual flash tanks may be used for each reactor in which case each outlet 13 would be manifolded to the recycle gas compressor 5.

Recycle gas from the alumina driers is taken by line 15 directly to a diluent recovery and fractionation system 7 where relatively pure methyl chloride is recovered from outlet 16. Aluminum chloride is subsequently introduced through line 18 and the solution therefrom is returned to reactors 1 and 2 by means of line 19. Also withdrawn from the diluent recovery and fractionation system 7 is a recycle liquid stream, in line 17, comprising about 95 wt. percent methyl chloride and 5 wt. percent isobutylene. This stream serves a two-fold purpose; firstly, a fresh monmer feed (both isoolefin and multiolefin) can be introduced through line 21 and the mixture therefrom can be recycled to reactors 1 and 2. Secondly, this liquid stream 17 is used to flush reactor 3, as required, to remove the rubbery polymer which is deposited upon the walls. Although this stream in line 17 is effective in flushing reactor 3, the gas created by flushing also passes through the diluent recovery and fractionating system 7. This means that the fractionating system must be designed for the usual reaction gas from the operating reactors plus the gas from the reactor being flushed. In other words, flushing increases the fractionation requirements as much as 33%. Furthermore, the cyclic variation of the flow to and within these towers provides adverse results in the purity of the methyl chloride solvent and affects reactor operation and control of the butyl rubber product quality.

It has now been discovered that the gas which results from flushing reactor 3 can be condensed upstream of the diluent recovery and fractionating system and taken directly back to the reactor. Therefore, the flow of the flushing gas is diverted and the size of the diluent recovery and fractionation system can be reduced by approximately 25%. Furthermore, the diluent and fractionation system can operate at constant conditions which thereby improves the purity of the overhead methyl chloride catalyst solvent, stabilizes the recycle diluent composition, and improves the control of the product quality in the polymerization reactors.

Figure 2:
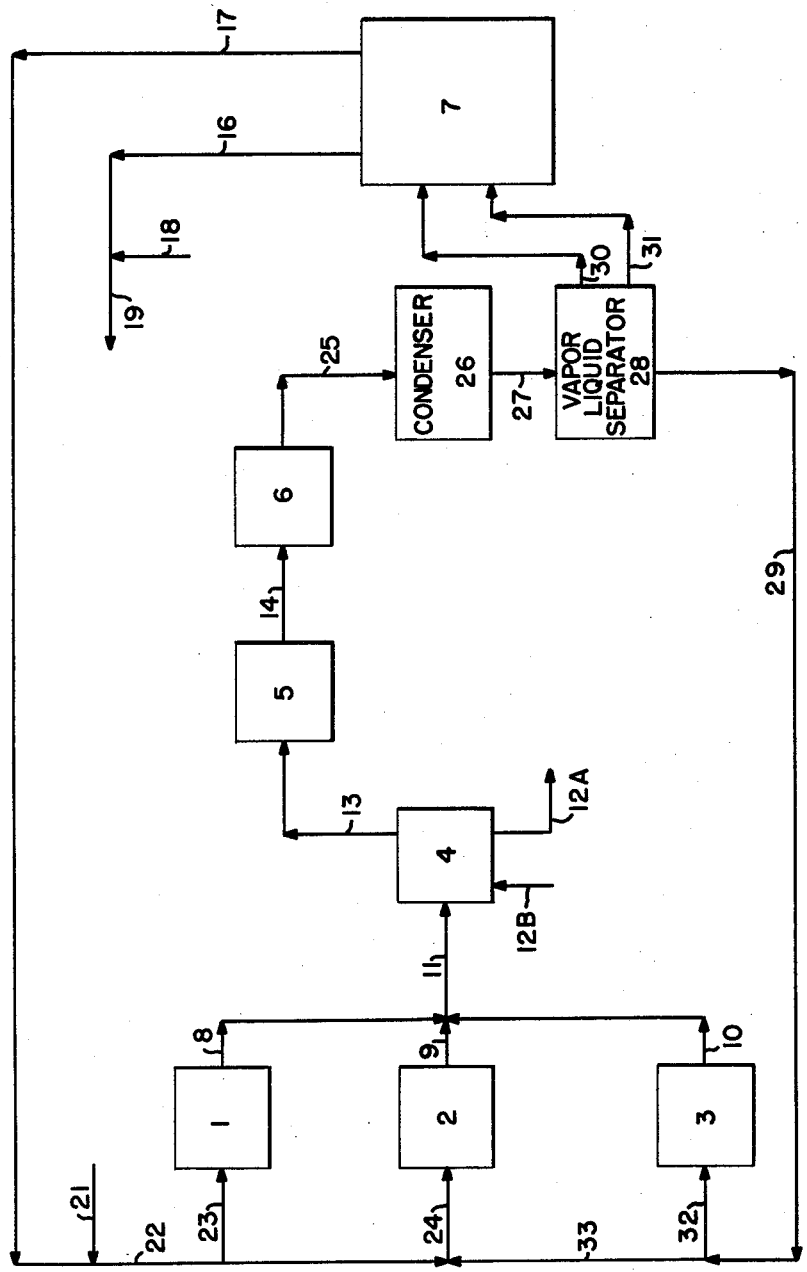
FIG. 2 represents the flow plan for the present invention.

FIG. 2 represents the present invention wherein the vaporized material from flash tank 4, after passing through gas compressor 5 and alumina driers 6, is sent to condenser 26 by means of line 25. This condenser can be regulated to vary the amount of vapor which is condensed into liquid. The vapor and liquid mixture, which is formed therein, is subsequently passed to a vapor-liquid separator 28 by means of line 27. This separator performs three functions. During the normal reaction process, the vapor phase therein is passed directly through line 30 into the diluent recovery and fractionation system 7 and part of the liquid phase is passed into the same system 7 through line 31. However, the third function of separator 28 is to provide a reservoir of liquid which can be transported directly to reactor 3 as a flushing medium to dilute the cold reactor slurry prior to naphtha washing to remove polymer which is deposited on the reactor walls. After dilution, the reactor is emptied by pressuring the reactor contents into flash tank 4. The flash tank gas is compressed, dried, partly condensed, and the condensate stored in separator 28 until it is again needed for the dilution and flushing of a reactor. Pure methyl chloride solvent is withdrawn by means of line 16, but it should be noted that line 17 only transports the isobutylene and methyl chloride stream to the reactors 1 and 2 which are involved in the normal polymerization process. Therefore, line 17 does not provide the means for flushing reactor 3.

A fourth function of separator 28 is to provide a supply of liquid which may be transported directly to reactor 3 as an initial polymerization charge to the reactor after it has been cleaned by naphtha washing. A further function of separator 28 is to provide a portion of liquid which may be used as part of the continuous feed by line 33 to operating reactors 1 and 2. The last two functions reduce the amount of isoprene that needs to be fed to the operating reactors since the reservoir liquid contains an enriched amount of unreacted isoprene monomer which would otherwise be purged from the fractionation system by line 58.

Thus, in accordance with this invention the quality of the rubber product and the purity of the methyl chloride solvent is improved. Furthermore, the size of fractionating system is reduced and a constant flow is maintained therein.

Figure 3:
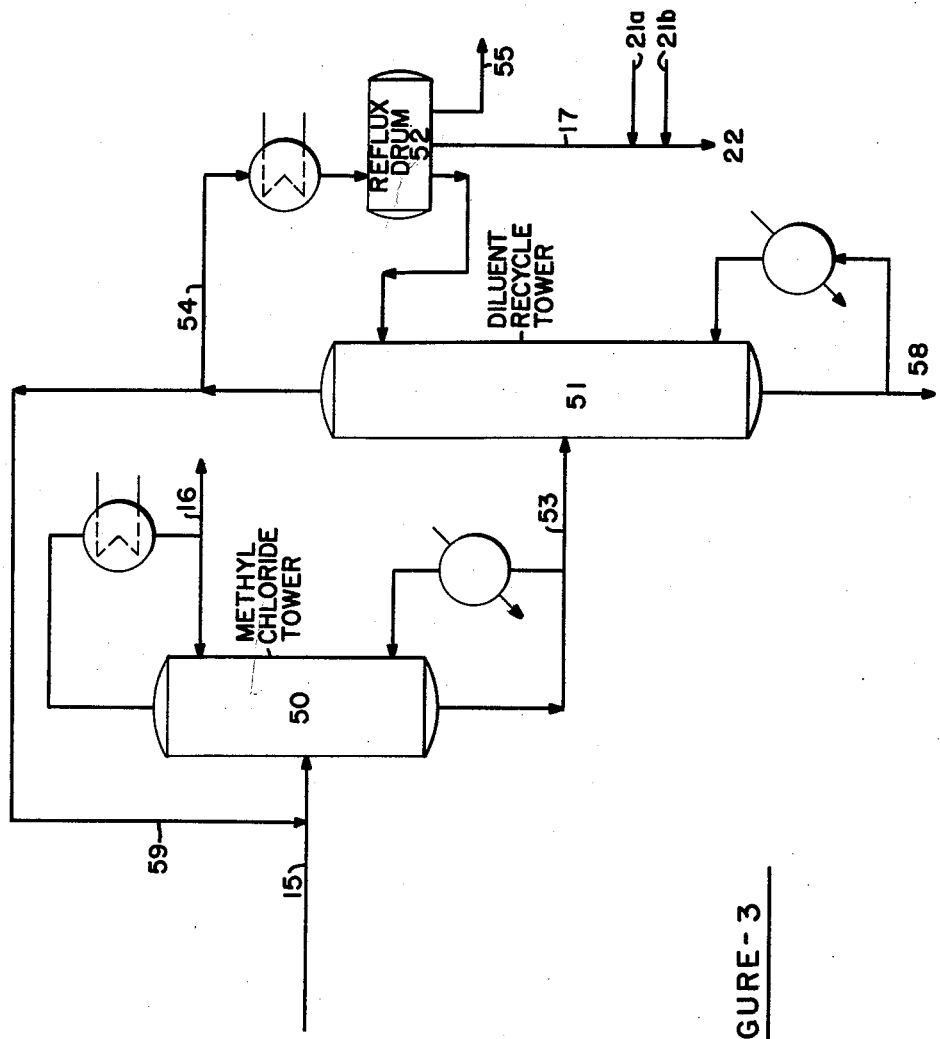
FIG. 3 is a detailed flow plan for the diluent recovery and fractionating system previously employed for flushing.

To illustrate the decreased equipment capacity required as a result of this invention, FIG. 3 is presented as representation of the diluent recovery and fractionating system previously employed in a butyl rubber plant having a production capacity of 20,000 long tons/year of butyl rubber. Into methyl chloride tower 50 is introduced, by means of line 15, 38,760 lbs./s.h. (stream hours) of vaporized material from the flash tank, after it has passed through the gas compressor and the alumina driers. This vapor enters tower 50 at a temperature of 365° F. with a pressure of 170 p.s.i.g. From the top of the tower is withdrawn 3,375 lbs./s.h. of pure methyl chloride solvent at 120° F. and 150 p.s.i.g. through line 16 utilizing an 8.5:1.0 reflux ratio. From the bottom of the methyl chloride catalyst tower 50 at a temperature of 195° F. and 180 p.s.i.g. is withdrawn 35,385 lbs./s.h. of methyl chloride, isoprene, and isobutylene which are transported by line 53 into diluent recycle tower 51. From this tower 1,101 lbs./s.h. of isoprene and $C_4$ purge materials are removed from bottom outlet 58 at a temperature of 195° F. and a pressure of 180 p.s.i.g. From the top of diluent recycle tower 51, by means of line 54, is withdrawn 120,000 lbs./s.h. of vapor at a temperature of 130° F. with a pressure of 170 p.s.i.g. The vapor in line 54, comprising about 95 wt. percent methyl chloride and 5 wt. percent isobutylene, is condensed and passed into reflux drum 52. From outlet 17 is withdrawn 24,284 lbs./s.h. of the liquid stream which is subsequently mixed with 6,683 lbs./s.h. of feed isobutylene from inlet 29a and 207 lbs./s.h. of feed isoprene from inlet 21b. The resulting solution of diluent and monomers is then transported through line 22 into the reactors which are being used in the polymerization process. Part of the recycle liquid in reflux drum 52 is held in reserve as a feed charge for the reactors or as a flushing medium for the reactor. When utilized the liquid is transported through outlet 55 at a rate of 10,000 lbs./s.h. to charge or flush a reactor. When not being utilized for charging or flushing, 10,000 lbs./s.h. of overhead recycle tower vapor is recycled through line 59 to the methyl chloride tower 50 in order to maintain feed rate to tower 50 constant as required to maintain conditions constant in tower 50.

Figure 4:
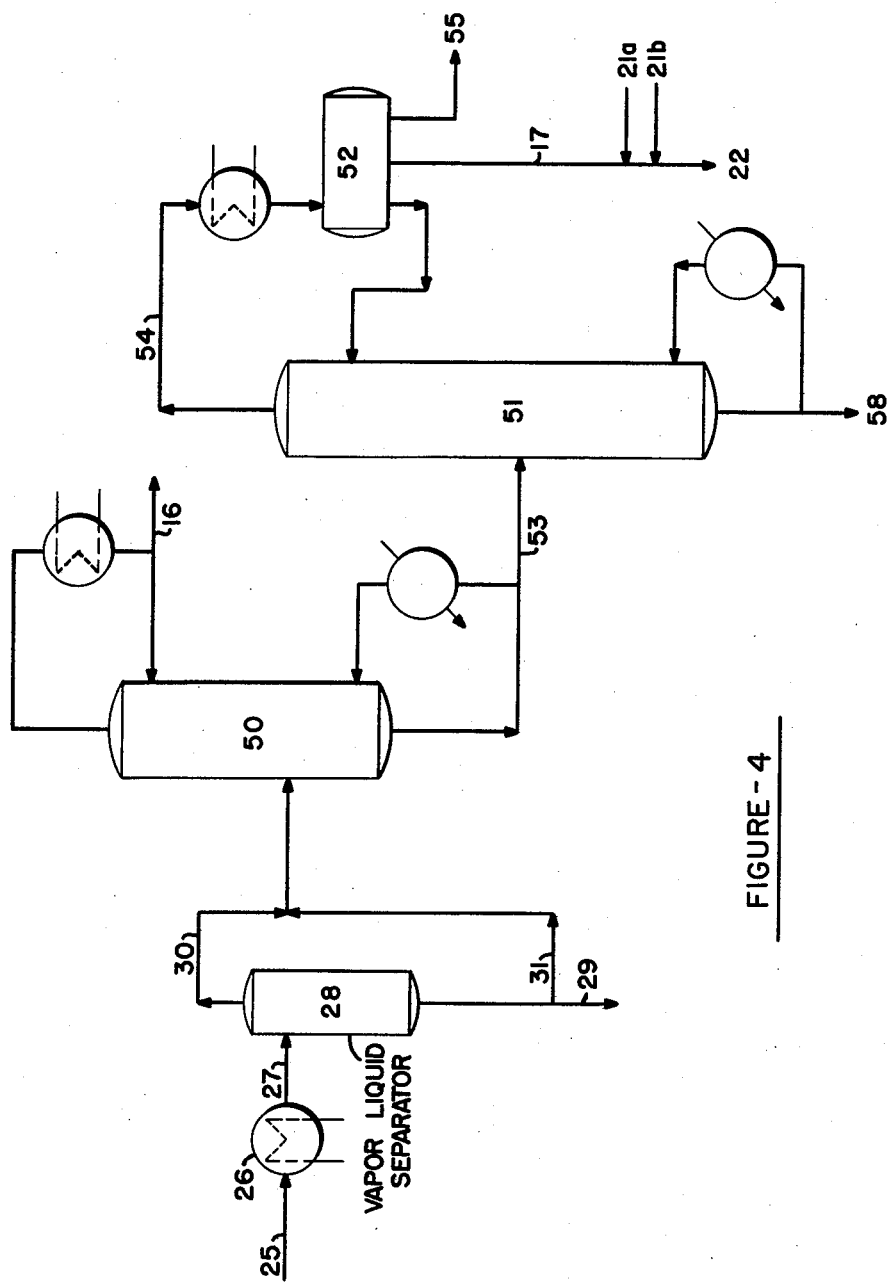
FIG. 4 shows the diluent recovery and fractionating system in accordance with the operation of the present invention.

In accordance with the present invention, as shown in FIG. 4, 39,791 lbs./s.h. of vaporized material from the flash tank, after passing through the gas compressor and alumina driers, were subsequently sent to condenser 26 by means of line 25. The mixture of vapor and liquid from the condenser was transported by line 27 to vapor liquid separator 28. From the top of the separator at 125° F. at a pressure of 165 p.s.i.g. was withdrawn 28,791 lbs./s.h. of vapor which passed through line 30 into methyl chloride tower 50. From the bottom of vapor liquid separator 28 was withdrawn 10,000 lbs./s.h. of liquid which was returned to one of the reactors as the flushing medium by means of line 29. Also from the bottom of the separator was withdrawn 1,000 lbs./s.h. of liquid which is passed by line 31 into the methyl chloride tower 50. At the top of the methyl chloride tower 50, at a temperature of 120° F. and a pressure of 150 p.s.i.g., was withdrawn 3,375 lbs./s.h. of relatively pure methyl chloride solvent. A reflux ratio of 8.5:1.0 was provided in the 65-plate tower and the solvent was transported by line 16 for catalyst incorporation and subsequent introduction into one of the two reactors operating under the normal reaction process. From the bottom of methyl chloride tower 50 at a temperature of 130° F. and a pressure of 160 p.s.i.g. was withdrawn 26,416 lbs./s.h. of methyl chloride, isoprene, and isobutylene. These bottoms were transported by line 53 for introduction to diluent recycle tower 51. At the bottom of this 30-plate recycle tower was withdrawn 1,101 lbs./s.h. of isoprene and $C_4$ purge at a temperature of 145° F. and a pressure of 190 p.s.i.g. This was accomplished by means of line 58. From the top of diluent recycle tower 51 at a temperature of 130° F. and a pressure of 170 p.s.i.g. was withdrawn methyl chloride and isobutylene as a recycle liquid stream. This stream was passed by means of line 54 into a reflux drum 52. A reflux ratio of 3.5:1.0 was employed. About 24,284 lbs./s.h. of recycled liquid stream was withdrawn from reflux drum 52 by outlet 17 and 6,685 lbs./s.h. of isobutylene feed (line 21a) and 207 lbs./s.h. of isoprene feed (line 21b) were introduced therein. The resulting solution was then transported by line 22 as feed for the two operating polymerization reactors. Part of the liquid recycle stream was held in reserve in reflux drum 52 as a charge for the reactors. This charge, 1,031 lbs./s.h., passed through line 55 to a reactor before the polymerization process was initiated.

The above demonstrates that, in the previous method for flushing, the capacity required for the methyl chloride tower 50 and the diluent recycle tower 51 was 38,650 and 35,385 lbs./s.h., respectively. However, the capacity required in accordance with the present invention was 29,791 and 26,416 lbs./s.h., respectively.

To summarize, this invention stabilizes the operation of the fractionation towers 50 and 51 and reduces the size of these towers and associated equipment for a given polymer production capacity.

Having described the general nature and specific embodiments of the invention, the true scope is now particularly pointed out in the appended claim.

What is claimed is:

In a polymerization process for the preparation of butyl rubber which includes polymerizing isobutylene with isoprene in a methyl chloride diluent in the presence of a Friedel-Crafts catalyst in solution at relatively low temperatures to provide a polymer slurry in volatile methyl chloride including small amounts of volatile unreacted isobutylene and isoprene, volatile catalyst solvent, and volatile $C_4$ purge, in a reaction zone; introducing said slurry into a flashing zone to flash off said volatile materials to provide a mixture of vapor and liquid; and passing said vapor and liquid mixture to a diluent recovery and fractionation system; the improvement which comprises: transporting said vapor and liquid mixture to a separating zone prior to its passage to the diluent recovery and fractionation system; separating the vapor from the liquid; passing said separated vapor into the diluent recovery and fractionation system; passing part of the separated liquid to said diluent recovery and fractionation system; maintaining the remaining part of the separated liquid as a reservoir in said separating zone; and periodically passing a portion of said reservoir as a flushing medium to said reaction zone; said process resulting in a 25% reduction of the required capacity of the diluent recovery and fractionation system.

References Cited in the file of this patent
UNITED STATES PATENTS

| | | |
|---|---|---|
| 2,563,624 | Small et al. | Aug. 7, 1951 |
| 2,580,019 | Gould et al. | Dec. 25, 1951 |
| 2,844,569 | Green et al. | July 22, 1958 |

OTHER REFERENCES

Serial No. 771,646 (Rowe et al.), filed Nov. 3, 1958, page 1, lines 16–24, page 7, lines 17–27, and page 8, lines 1–24; and FIGURE 1 and FIGURE 3.